US008336035B2

(12) United States Patent
Lambert et al.

(10) Patent No.: US 8,336,035 B2
(45) Date of Patent: Dec. 18, 2012

(54) CUSTOMIZABLE DYNAMIC LANGUAGE EXPRESSION INTERPRETER

(75) Inventors: John Robert Lambert, Bothell, WA (US); Kenneth D. Wolf, Seattle, WA (US); Geoffrey M. Kizer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1008 days.

(21) Appl. No.: 12/336,179

(22) Filed: Dec. 16, 2008

(65) Prior Publication Data

US 2010/0153930 A1 Jun. 17, 2010

(51) Int. Cl.
*G06F 9/45* (2006.01)

(52) U.S. Cl. ........ 717/136; 717/137; 717/139; 717/144; 717/148; 717/153

(58) Field of Classification Search .................. None
See application file for complete search history.

(56) References Cited

U.S. PATENT DOCUMENTS

| | | | | |
|---|---|---|---|---|
| 5,428,782 | A * | 6/1995 | White | 718/101 |
| 5,583,988 | A * | 12/1996 | Crank et al. | 714/48 |
| 6,115,711 | A * | 9/2000 | White | 1/1 |
| 6,594,783 | B1 | 7/2003 | Dollin et al. | |
| 6,983,227 | B1 * | 1/2006 | Thalhammer-Reyero | 703/2 |
| 7,023,839 | B1 * | 4/2006 | Shaffer et al. | 370/356 |
| 7,168,063 | B2 | 1/2007 | Meijer | |
| 7,296,130 | B2 * | 11/2007 | Dimpsey et al. | 711/170 |
| 7,330,698 | B1 * | 2/2008 | Bolt et al. | 455/63.1 |
| 7,533,165 | B1 * | 5/2009 | Hogstrom et al. | 717/105 |
| 2004/0194069 | A1 * | 9/2004 | Surasinghe | 717/136 |
| 2006/0005172 | A1 * | 1/2006 | Fuchs | 717/136 |
| 2006/0236254 | A1 * | 10/2006 | Mateescu et al. | 715/762 |
| 2007/0239505 | A1 | 10/2007 | Shukla et al. | |
| 2007/0263541 | A1 * | 11/2007 | Cobb et al. | 370/235 |
| 2008/0022267 | A1 | 1/2008 | Johnson, Jr. et al. | |
| 2008/0195634 | A1 | 8/2008 | Christensen et al. | |
| 2008/0222627 | A1 | 9/2008 | Kaplan et al. | |
| 2009/0100443 | A1 * | 4/2009 | Bohle et al. | 719/320 |
| 2010/0077384 | A1 * | 3/2010 | Ostrovsky et al. | 717/127 |
| 2010/0145946 | A1 * | 6/2010 | Conrad et al. | 707/736 |
| 2010/0250564 | A1 * | 9/2010 | Agarwal et al. | 707/756 |
| 2011/0055800 | A1 * | 3/2011 | Kevorkian | 717/104 |

OTHER PUBLICATIONS

Signal-to-string conversion based on high likelihood regions using embedded dynamic programming,, author: Gong Y et al, source: IEEE, dated: 1991.*
Rick Byers, Generic type parameter variance in the CLR, http://blogs.msdn.com/rmbyers/archive/2005/02/16/375079.aspx, Feb. 16, 2005, 9 Pages.

(Continued)

*Primary Examiner* — Chameli Das
(74) *Attorney, Agent, or Firm* — Workman Nydegger

(57) ABSTRACT

Embodiments described herein are directed to allowing a user to extend the functionality of a software code interpretation system. In one embodiment, a computer system receives user-defined conversion rules from a user for converting dynamic language code to continuation-based abstract memory representations. The computer system identifies portions of software code that are to be converted from dynamic language abstract memory representations into continuation-based abstract memory representations, where the identified code portions include undefined, extensible input primitives. The computer system also generates a dynamic, extensible set of output primitives interpretable by a continuation-based code interpretation system using the received conversion rules and converts the identified code portions including the undefined, extensible input primitives from dynamic language abstract memory representations into continuation-based abstract memory representations using the generated set of output primitives.

20 Claims, 4 Drawing Sheets

OTHER PUBLICATIONS

Werner Schuster, Microsoft Surpasses Java's Dynamic Language Support?, http://www.infoq.com/news/2007/05/java-dlr, May 7, 2007, 12 Pages.

Ryan Paul, Net and Java to get better dynamic language support, http://arstechnica.com/news.ars/post/20060810-7462.html, Aug. 10, 2006, 2 Pages.

Dermot Hogan, DLR—Build Your Own Language (without tears), http://www.bitwisemag.com/2/DLR-Build-Your-Own-Language, Mar. 3, 2008, 5 Pages.

Joe Marshall, S-code, http://funcall.blogspot.com/2008/09/s-code.html, Sep. 2, 2008, 3 Pages.

* cited by examiner

CUSTOMIZABLE DYNAMIC LANGUAGE EXPRESSION INTERPRETER

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks. For example, word processor applications are designed for drafting documents, while email programs are designed for sending, receiving and organizing email.

In many cases, software applications are designed to interact with other software applications or data on other computer systems. Applications may also be configured to implement various types of software code. For example, a software application may incorporate or be generated using a dynamic software language. Dynamic languages can allow for greater flexibility in using software components written in different software languages. Typically, when code portions written in multiple software languages are to be used, multiple language-specific code interpreters are used to interpret the various code portions.

BRIEF SUMMARY

Embodiments described herein are directed to allowing a user to extend the functionality of a software code interpretation system. In one embodiment, a computer system receives user-defined conversion rules from a user for converting dynamic language code to continuation-based abstract memory representations. The computer system identifies portions of software code that are to be converted from dynamic language abstract memory representations into continuation-based abstract memory representations, where the identified code portions include undefined, extensible input primitives. The computer system also generates a dynamic, extensible set of output primitives interpretable by a continuation-based code interpretation system using the received conversion rules and converts the identified code portions including the undefined, extensible input primitives from dynamic language abstract memory representations into continuation-based abstract memory representations using the generated set of output primitives.

Another embodiment is directed to selecting an appropriate runtime backend from a plurality of available runtime backends for interpreting and executing a portion of software code, such that the selected backend is selected for interpreting an expression tree representation of a dynamic code portion. A computer system identifying a portion of dynamic code that is to be converted into an expression tree representation. The computer system evaluates the identified portion of dynamic code to determine, based on a set of input rules, which backend runtime among a plurality of backend runtimes is to be used. The computer system also converts the identified dynamic code portion into an expression tree representation for the identified appropriate backend runtime and provides the expression tree representation to the identified backend runtime for execution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
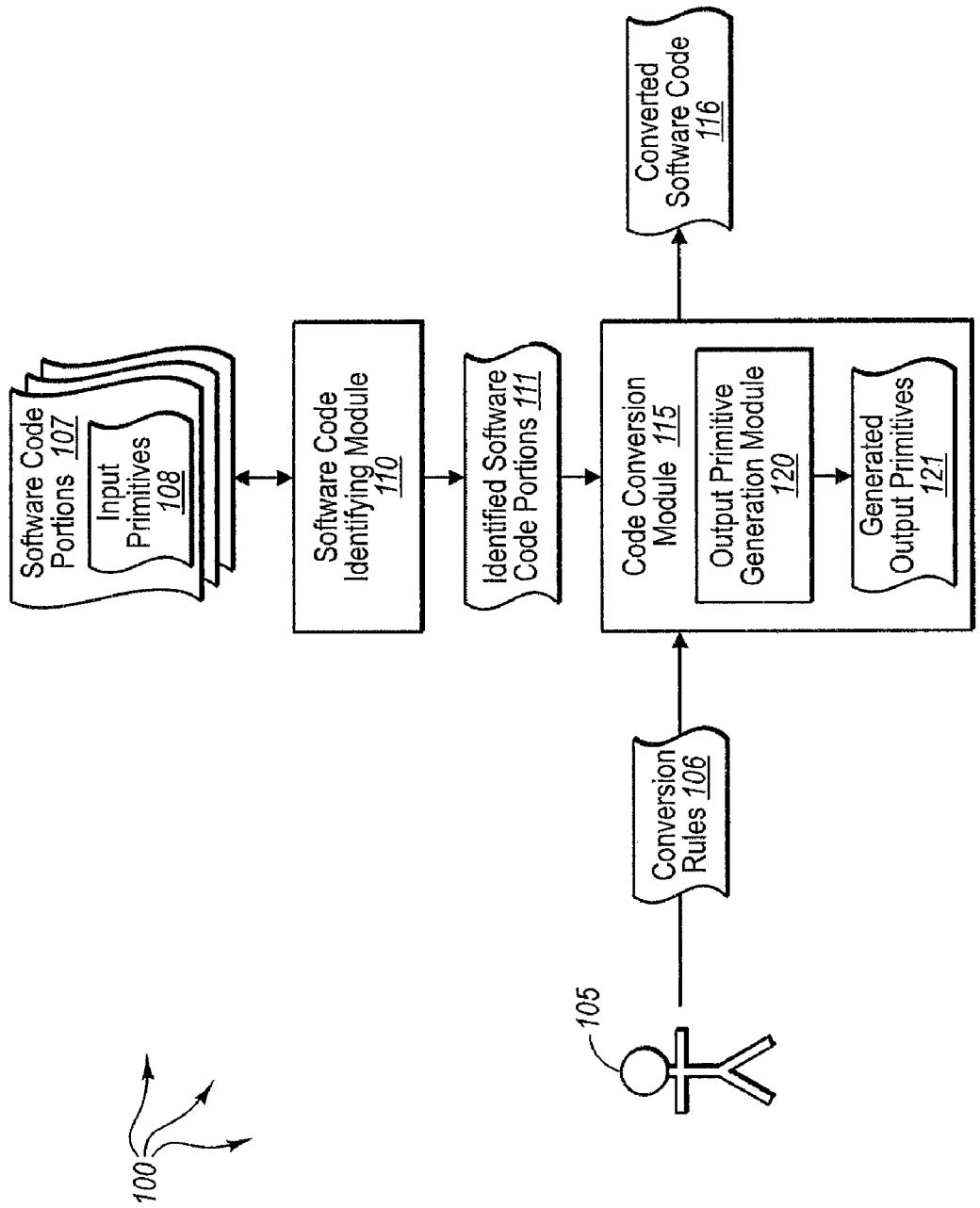
FIG. 1 illustrates a computer architecture in which embodiments of the present invention may operate including allowing a user to extend the functionality of a software code interpretation system.

Embodiments described herein are directed to allowing a user to extend the functionality of a software code interpretation system. In one embodiment, a computer system receives user-defined conversion rules from a user for converting dynamic language code to continuation-based abstract memory representations. The computer system identifies portions of software code that are to be converted from dynamic language abstract memory representations into continuation-based abstract memory representations, where the identified code portions include undefined, extensible input primitives. The computer system also generates a dynamic, extensible set of output primitives interpretable by a continuation-based code interpretation system using the received conversion rules and converts the identified code portions including the undefined, extensible input primitives from dynamic language abstract memory representations into continuation-based abstract memory representations using the generated set of output primitives.

Another embodiment is directed to selecting an appropriate runtime backend from a plurality of available runtime backends for interpreting and executing a portion of software code, such that the selected backend is selected for interpreting an expression, tree representation of a dynamic code portion. A computer system identifying a portion of dynamic code that is to be converted into an expression tree representation. The computer system evaluates the identified portion of dynamic code to determine, based on a set of input rules, which backend runtime among a plurality of backend runtimes is to be used. The computer system also converts the identified dynamic code portion into an expression tree representation for the identified appropriate backend runtime and provides the expression tree representation to the identified backend runtime for execution.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes software code portions 107. Software code portions 107 may include any type of software code including methods, functions, applications, applets, individual lines of code, or any other grouping of software instructions. Software code portions 107 include input primitives 108. As will be generally understood by one skilled in the art, a primitive may be any type of input designator and may describe available variables, variable types, operators, method implementation features or other items usable in software code to initiate or perform a function. Primitives are typically language-specific; accordingly, primitives available in one language may not be available in another language. Moreover, primitives are typically a fixed set, as the primitives are only, understood by operations of that given language.

Computer architecture 100 also includes software code identifying module 110. Module 110 may be used to identify various portions of software code 107 that are to be accessed and used by a user or other software program. For example, a user (e.g. user 105) may desire to implement a software application that combines multiple different software code portions. In some cases, these code portions may be written in different software languages. Based on an indication of which code portions are to be used (either as received from user 105 or as identified by software code identifying module 110), identified software code portion 111 may be sent to code conversion module where each portion of software code may be converted for use by another computer system. Code conversion module 115 may receive conversion rules 106 from user 105 which indicate how the identified code portions are to be converted.

For instance, in the above example where multiple portions of software code written in different languages are to be used in conjunction to provide a particular function or feature, at least some of the code portions will be converted into a usable form (those portions that are already usable or understandable would not need to be converted). As used herein, the usable or understandable form is intended to mean a form that can be used by a computer system configured to receive converted software code 116, without the computer system having multiple software interpreters. Accordingly, because of the code conversion process, the converted code 116 is understandable by a single software interpreter on the receiving computer system. Such a receiving computer system may be any type of computer system, as described above, and may include user 105's computer system or any other user's computer system.

Code conversion module 115 may be configured to portions of software code from one type to another. For example, code conversion module 115 may be configured to covert dynamic language abstract memory representations into continuation-based abstract memory representations. Thus, in cases where software code portions 107 are in the form of dynamic language abstract memory representations (e.g. dynamic language abstract syntax trees (ASTs)), the portions may be converted to continuation-based abstract memory representations (e.g. continuation-based runtime ASTs). This process will be explained in greater detail below with regard to method 200 of FIG. 2. Output primitive generation module 120 may be part of code conversion module 115 or may be separate from module 115. Output primitive generation module may be configured to generate output primitives based on input primitives 108. These generated output primitives 121 may be used in the code conversion process by code conversion module 115, as will be explained in greater detail below. In general, and as used herein, the term output primitives refers to a set of instructions that tells the interpreter or runtime to perform the operation indicated in the input primitive or to convert the operation to a function at runtime.

Figure 2:
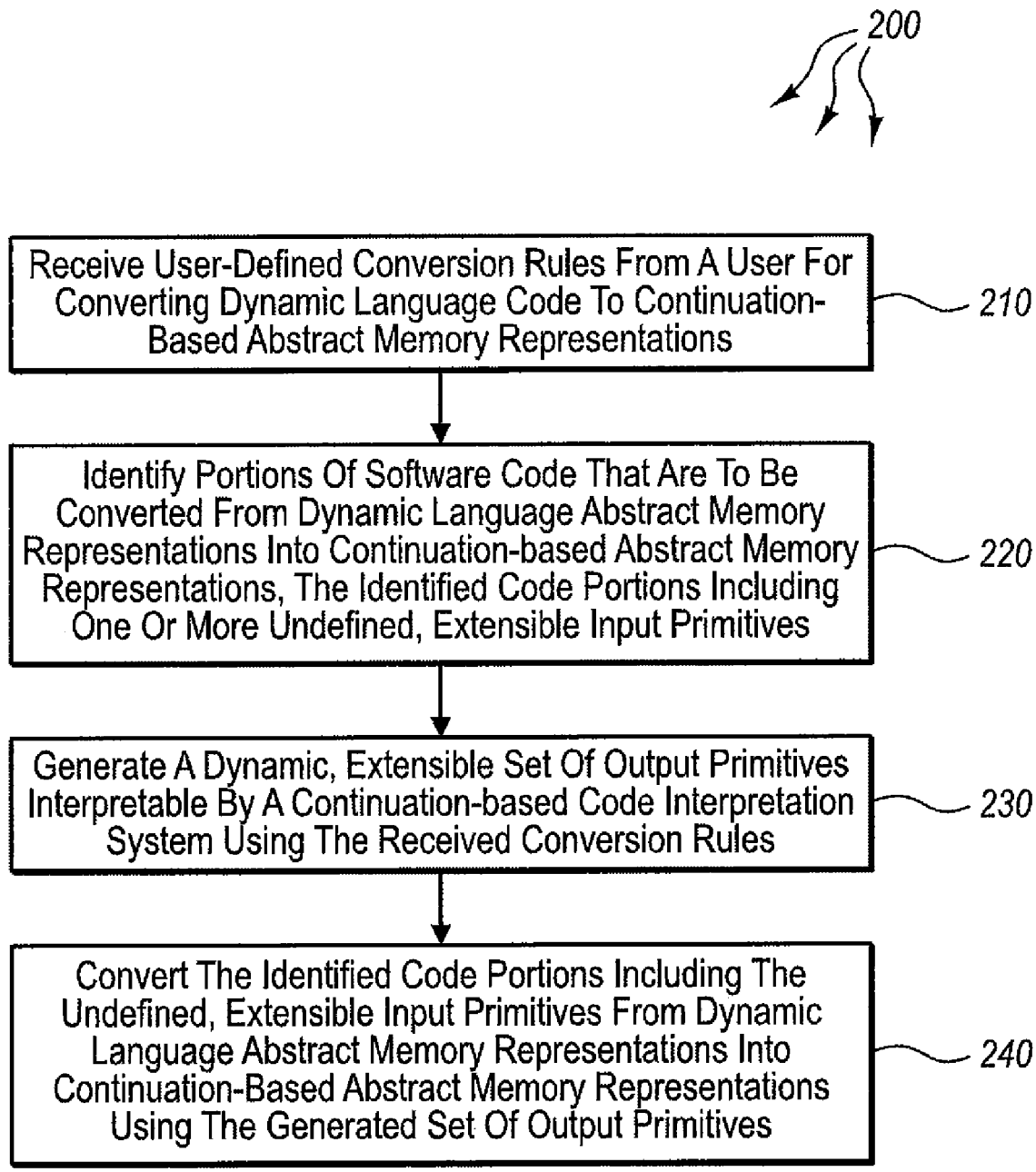
FIG. 2 illustrates a flowchart of an example method for allowing a user to extend the functionality of a software code interpretation system.

FIG. 2 illustrates a flowchart of a method 200 for allowing a user to extend the functionality of a software code interpretation system. The method 200 will now be described with frequent reference to the components and data of environment 100.

Method 200 includes an act of receiving one or more user-defined conversion rules from a user for converting dynamic language code to continuation-based abstract memory representations (act 210). For example, code conversion module 115 may receive conversion rules 106 from user 105 for converting dynamic language code to continuation-based abstract memory representations. Language-specific conversion rules may be created to optimize software code conversions for code written in a given software language. Each language may have certain characteristics that favor certain types or methods of conversion over others. For example, a given type of conversion may be more efficient for certain languages than another type. In such cases, the most efficient conversion rules may be selected and/or provided by user 105. Conversion rules 106 may also be selected using backward chaining, which selects a path of conversion rules to use in the conversion. Again, this path may be optimized to create the most efficient code conversion.

In some embodiments, the received rules 106 may include an indication that a different version of the software code interpretation system (i.e. modules 110 and 115) is to be used to convert software code portion 107 using received conversion rules 106. In cases where multiple versions of either module 110 or module 115 exist, one version may be selected above another to ensure compatibility or increase efficiency. As used herein, the concept of increasing efficiency may include reducing processing time or cycles, reducing memory fingerprint, reducing communications with other modules, or any other type of reduction in the use of system resources.

Method 200 includes an act of identifying one or more portions of software code that are to be converted from dynamic language abstract memory representations into continuation-based abstract memory representations, the identified code portions including one or more undefined, extensible input primitives (act 220). For example, software code identifying module 110 may identify software code portions 107 that are to be converted from dynamic language abstract memory representations into continuation-based abstract memory representations, where identified code portions 111 include various undefined, extensible input primitives. As used herein, the term "undefined," as used in conjunction with input primitives or other objects, is intended to indicate that at least some characteristics of the object are not known beforehand. Thus, for example, input primitive 108 may be undefined because it includes various characteristics that are unknown to the interpretation system. Input primitives may be extensible and may be added to by user 105. Because the software code portions are convertible using conversion rules, the conversion rules may also be used to indicate new input primitives and, further, how the new, user-defined input primitives are to be interpreted by the interpretation system.

In some cases, the input primitives 108 may be appropriate for a workflow runtime and the generated output primitives 121 may be appropriate for a sequential-based runtime. The opposite is also true: input primitives 108 may be appropriate for a sequential-based runtime and generated output primitives 121 may be appropriate for a workflow runtime. Regardless of which runtime the input primitives are designed to work with, the generated output primitives may be converted to be appropriate for a designated runtime environment.

Method 200 includes an act of generating a dynamic, extensible set of output primitives interpretable by at least one of a plurality of continuation-based code interpretation systems using the received conversion rules (act 230). For example, output primitive generation module may generate a dynamic, extensible set of output primitives 121 that is interpretable by at least one of a plurality of continuation-based code interpretation systems using received conversion rules 106. In some cases, the software code interpretation system is configured to handle type relationships in the code transparently. Accordingly, in cases where a first variable maps to a second variable, and where the second variable is a subtype of a third variable, the first variable is automatically mapped to the third variable. Thus, for example, if variable X maps to variable Y, where Y is a subtype of variable Z, variable X is automatically mapped to variable Z. This ability to handle type relationships transparently can greatly increase system efficiency by automatically mapping variables where possible.

Additionally or alternatively, the software code interpretation system may be configured to handle generic parameter covariance. As used herein, generic parameter covariance allows a variable of a given subtype to be treated as a variable of the subtype's corresponding base type. Generic parameter covariance may also lead to increased efficiencies in code interpretation and conversion. The interpretation system may be further configured to allow recursion. Recursion allows a user to define a conversion from a first variable to a second variable, and where the interpretation system includes an existing conversion from the second variable to a third variable, the interpretation system may be automatically configured to use the existing conversion to carry out a conversion from the first variable to the third variable. Thus, if a user defines a conversion from X to Y where the interpretation system includes an existing conversion from Y to Z, the interpretation system may use the existing conversion to convert X to Z. Other examples incorporating recursion with more than three variables are also possible. Accordingly, the above example should not be read as limiting recursion to use in a three-variable scenario.

Method 200 includes an act of converting the identified code portions including the one or more undefined, extensible input primitives from dynamic language abstract memory representations into continuation-based abstract memory representations using the generated set of output primitives (act 240). For example, code conversion module 115 may convert identified code portions 111 including the one or more undefined, extensible input primitives 108 from dynamic language abstract memory representations into continuation-based abstract, memory representations using generated set of output primitives 121. This conversion may be performed at compile-time or may be performed as a just-in-time conversion based on dynamic conversion information received at runtime (e.g. conversion rules 106).

In some embodiments, code conversion module 115 may be configured to convert variables, arguments or other expressions from language variable expressions to a workflow variable expression, so that the workflow expression is configured to take values from a workflow and use the values during language execution. Code conversion module 115 may also be configured to convert software code portion 107 from a continuation-based expression to a language expression. Many other conversion types are possible. Moreover, a software code portion may be converted more than once from one type of expression to another and then to another, and so on. In some cases, multiple different backend runtimes may be available and the software code portion may be converted in a different manner, depending on which backend runtime is to be used. This will be explained in greater detail below with regard to computer architecture 300 of FIG. 3 and method 400 of FIG. 4.

Figure 3:
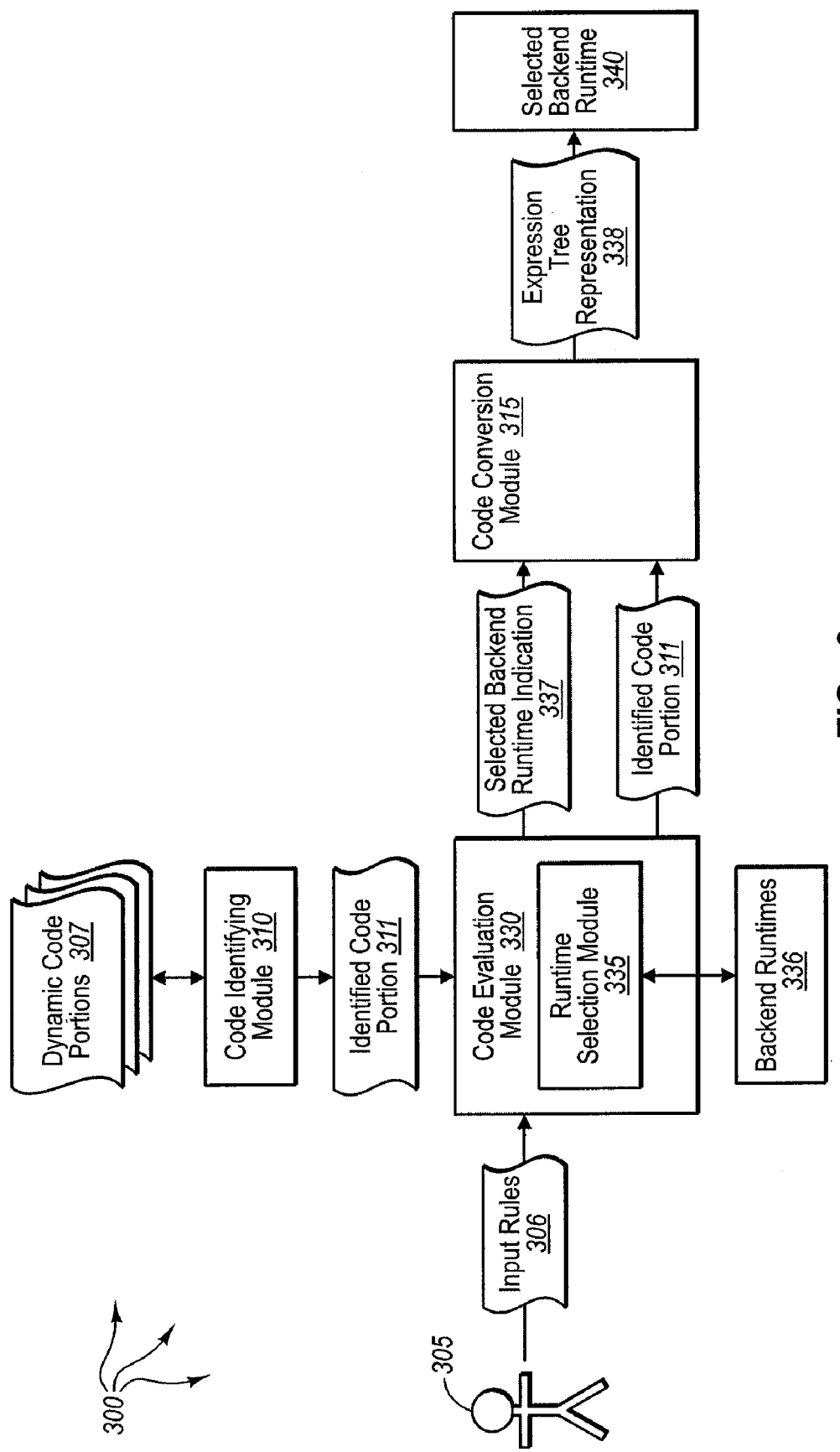
FIG. 3 illustrates a computer architecture in which embodiments of the present invention may operate including selecting an appropriate runtime backend from a plurality of available runtime backends for interpreting and executing a portion of software code.

FIG. 3 illustrates a computer architecture 300 in which the principles of the present invention may be employed. Computer architecture 300 includes code conversion module 315, code identifying module 310 and other modules which may be different than or the same as the corresponding modules of FIG. 1. In general, like reference numbers (e.g. 115 and 315) refer to similar or the same types of module. However, each element in FIG. 3 may be completely different and separate from the elements of FIG. 1.

Computer architecture 300 includes user 305, which may be any type of computer user, and dynamic code portions 307, which may be any type of dynamic software code. Code identifying module 310 may be configured to identify various portions of dynamic code that are to be converted for use by user 305 or by another user or software application. Identified code portions 311 may be sent to code evaluation module 330, which may be configured to evaluate the identified code portion to determine which backend runtime from a plurality of backend runtimes 336 is to be used in conjunction with the identified code. Using this determination, runtime selection module 335 may be configured to select the appropriate backend runtime and send an indication thereof (e.g. 337) to code conversion module 315. Module 315 may also receive identified code portion 311, which is converted into expression tree representation 338 and sent to selected backend runtime 340. This process will be explained in greater detail with regard to method 400 of FIG. 4 below.

Figure 4:
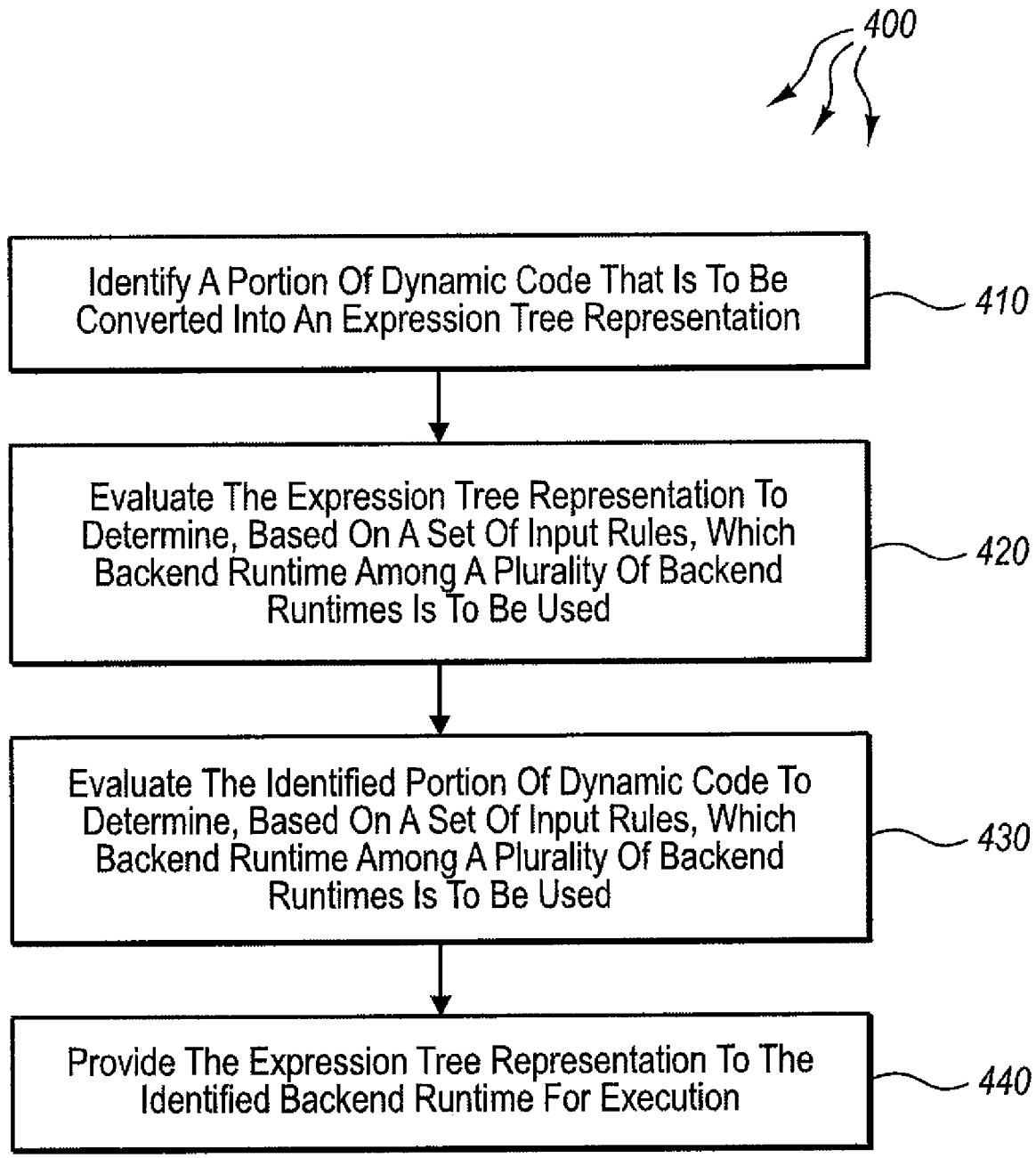
FIG. 4 illustrates a flowchart of an example method for selecting an appropriate runtime backend from a plurality of available runtime backends for interpreting and executing a portion of software code.

FIG. 4 illustrates a flowchart of a method 400 for selecting an appropriate runtime backend from a plurality of available runtime backends for interpreting and executing a portion of software code. The method 400 will now be described with frequent reference to the components and data of environment 300.

Method 400 includes an act of identifying a portion of dynamic code that is to be converted into an expression tree representation (act 410). For example, code identifying module 310 may identify dynamic code portion 311 that is to be converted into an expression tree representation. Dynamic language code, as used herein, is code that is converted to executable form at runtime (as opposed to being compiled beforehand). Dynamic language code may be compiled or interpreted by a just-in-time (JIT) compiler or other compiler/interpreter designed to compile or interpret dynamic code.

Method 400 includes an act of evaluating the identified portion of dynamic code to determine, based on a set of input rules, which backend runtime among a plurality of backend runtimes is to be used (act 420). For example, code evaluation module 330 may evaluate the identified portion of dynamic code 311 to determine, based on a set of input rules 306, which backend runtime among a plurality of backend runtimes is to be used to process the converted code portion. Accordingly, when a third party or other user writes a new software language or new version of a software language, they can just provide rules (e.g. input rules 306) for when the code conversion module 315 (interpreter) should use that language or that version.

Method 400 includes an act of converting the identified dynamic code portion into an expression tree representation for the identified appropriate backend runtime (act 430). For example, code conversion module 315 may convert identified dynamic code portion 311 into an expression tree representation 338 for selected backend runtime 340. In some cases, the conversion may be performed based on one or more efficiency factors that indicate that a conversion should be performed. Efficiency factors may comprise one or more of the following: a determination that processing the software code portion will include waiting on other inputs, a determination that processing the software code will be computationally simple or computationally complex, and a determination that processing the software code will include the use of networking resources.

Thus, in some embodiments, it may be determined that processing identified code portion 311 would involve waiting on other inputs (e.g. inputs from other functions or other software applications). Thus, in such a case, it may be more efficient to perform the conversion from dynamic code into an expression tree representation so that the code can be registered for continuation-based processing. Similarly, if it is determined that processing the dynamic code will be computationally complex or that the processing will include the (substantial) use of networking resources, it may be most efficient to perform the conversion. On the other hand, it may be determined that the processing will be computationally simple, or that the processing does not depend on other inputs, and thus, a conversion from dynamic code to an expression tree representation is inefficient and should not be performed. In some cases, where it is determined that processing the software code will be computationally complex, the software code may be divided into a plurality of computationally simpler code portions, which may not be converted.

Method 400 includes an act of providing the expression tree representation to the identified backend runtime for execution (act 440). For example, code conversion module 315 may provide expression tree representation 338 to selected backend runtime 340 for execution. In this manner, a wide variety of different front end languages may be used to draft the various dynamic code portions, and each of these dynamic code portions may be interpreted by a single interpretation system, using the input rules provided by the developers of the various dynamic code portions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system in a computer networking environment including a plurality of computing systems, a method for allowing a user to extend functionality of a software code interpretation system, the method comprising:

an act of the computer system, which includes at least one processing device, receiving one or more user-defined conversion rules from a user for converting dynamic language code to continuation-based abstract memory representations;

an act of the computer system identifying one or more portions of software code that are to be converted from dynamic language abstract memory representations into continuation-based abstract memory representations, the identified code portions including one or more undefined and extensible input primitives;

an act of the computer system generating a dynamic, extensible set of output primitives interpretable by at least one of a plurality of continuation-based code interpretation systems using the received conversion rules; and an act of the computer system converting the identified code portions including the one or more undefined and extensible input primitives from dynamic language abstract memory representations into continuation-based abstract memory representations using the generated set of output primitives.

2. The method of claim 1, further comprising an act of converting a variable from a language variable expression to a workflow variable expression, wherein the workflow expression is configured to take values from a workflow and use the values during language execution.

3. The method of claim 1, wherein the software code interpretation system is configured to handle type relationships transparently, where a first variable maps to a second variable, the second variable is a subtype of a third variable, and the first variable is automatically mapped to the third variable.

4. The method of claim 1, wherein the software code interpretation system handles generic parameter covariance, wherein a variable of a given subtype is treated as a variable of the subtype's corresponding base type.

5. The method of claim 1, wherein the interpretation based on conversion rules allows recursion, where a user defines a conversion from a first variable to a second variable, the interpretation system includes an existing conversion from the second variable to a third variable, and the interpretation system is configured to use the existing conversion to carry out a conversion from the first variable to the third variable.

6. The method of claim 1, wherein the conversion rules are selected using backward chaining, the backward chaining being configured to select a path of conversion rules.

7. The method of claim 1, wherein the conversion is performed at compile-time.

8. The method of claim 1, wherein the conversion is performed as a just-in-time conversion based on dynamic conversion information received at runtime.

9. The method of claim 1, wherein the software code interpretation system converts the software code portion from a continuation-based expression to a language expression.

10. The method of claim 1, further comprising an act of creating one or more language-specific conversion rules to optimize software code conversions for code written in a selected language.

11. The method of claim 1, wherein the received rules include an indication that a different version of the software code interpretation system is to be used to convert the software code portion using the received conversion rules.

12. The method of claim 1, wherein the input primitives are appropriate for a workflow runtime and the output primitives are appropriate for a sequential-based runtime.

13. The method of claim 1, wherein the input primitives are appropriate for a sequential-based runtime and the output primitives are appropriate for a workflow runtime.

14. A computer program product for implementing a method for selecting an appropriate runtime backend from a plurality of available runtime backends for interpreting and executing a portion of software code, the selected backend being selected for interpreting an expression tree representation of a dynamic code portion, the computer program product comprising one or more computer-readable physical storage device having stored thereon computer-executable instructions that, when executed by one or more processors of the computing system, cause the computing system to perform the method, the method comprising:

an act of identifying a portion of dynamic code that is to be converted into an expression tree representation;

an act of evaluating the identified portion of dynamic code to determine, based on a set of input rules, which backend runtime among a plurality of backend runtimes is to be used;

an act of converting the identified dynamic code portion into an expression tree representation for the identified appropriate backend runtime, wherein the converting of the identified dynamic code portion into the expression tree representation is converted in a different manner for the identified backend runtime than if the identified dynamic code portion were converted into the expression tree representation for a different backend runtime from among the plurality of backend runtimes; and an act of providing the expression tree representation to the identified backend runtime for execution.

15. The computer program product of claim 14, further comprising an act of determining that, based on one or more efficiency factors, a conversion is to be performed on the portion of dynamic code.

16. The computer program product of claim 14, further comprising an act of determining that, based on one or more efficiency factors, a conversion is not to be performed on the portion of dynamic code.

17. The computer program product of claim 16, further comprising, upon determining that processing the software code will be computationally complex, an act of dividing the software code into a plurality of computationally simpler code portions.

18. The computer program product of claim 15, wherein the efficiency factors comprise one or more of the following: a determination that processing the software code portion will include waiting on other inputs, a determination that processing the software code will be computationally simple or computationally complex, and a determination that processing the software code will include the use of networking resources.

19. The computer program product of claim 14, wherein the set of input rules are received from a third party user.

20. A computer system comprising the following:

one or more processors; and one or more computer-readable physical storage device having stored thereon computer-executable instructions that, when executed by the one or more processors, causes the computing system to perform a method for allowing a user to extend the functionality of a software code interpretation system, the method comprising the following:

an act of receiving one or more software-language-specific user-defined conversion rules from a user for converting dynamic language code to continuation-based abstract memory representations, the rules being configured to optimize software code conversions for code written in a selected language;

an act of identifying one or more portions of software code that are to be converted from dynamic language abstract memory representations into continuation-based abstract memory representations, the identified code portions including one or more undefined and extensible input primitives;

an act of generating a dynamic, extensible set of output primitives interpretable by at least one of a plurality of continuation-based code interpretation systems using the received conversion rules, the software code interpretation systems being configured to handle type relationships transparently, where a first variable maps to a second variable, and where the second variable is a subtype of a third variable, and wherein the first variable is automatically mapped to the third variable; and an act of converting at compile time the identified code portions including the one or more undefined and extensible input primitives from dynamic language abstract memory representations into continuation-based abstract memory representations using the generated set of output primitives.

* * * * *